(12) United States Patent
Hirsch et al.

(10) Patent No.: US 9,941,057 B2
(45) Date of Patent: Apr. 10, 2018

(54) THERMAL TRANSFER DEVICE, TEMPERATURE-CONTROL PANEL, AND ENERGY STORAGE DEVICE

(71) Applicant: Behr Gmbh & Co. KG, Stuttgart (DE)

(72) Inventors: Stefan Hirsch, Stuttgart (DE); Caroline Janzen, Stuttgart (DE); Matthias Stripf, Karlsruhe (DE); Achim Wiebelt, Neustadt (DE)

(73) Assignee: Behr GmbH & Co. KG, Stuttgart (DE)

( * ) Notice: Subject to any disclaimer, the term of this patent is extended or adjusted under 35 U.S.C. 154(b) by 537 days.

(21) Appl. No.: 14/245,573

(22) Filed: Apr. 4, 2014

(65) Prior Publication Data
US 2014/0220397 A1    Aug. 7, 2014

Related U.S. Application Data

(63) Continuation of application No. PCT/EP2012/069592, filed on Oct. 4, 2012.

(30) Foreign Application Priority Data

Oct. 4, 2011   (DE) .................. 10 2011 084 002

(51) Int. Cl.
| | |
|---|---|
| *H01M 10/653* | (2014.01) |
| *H01G 11/18* | (2013.01) |
| *H01M 10/615* | (2014.01) |
| *H01M 10/6556* | (2014.01) |
| *H01M 10/6568* | (2014.01) |
| *H01M 10/617* | (2014.01) |
| *H01M 10/613* | (2014.01) |

(52) U.S. Cl.
CPC .......... *H01G 11/18* (2013.01); *H01M 10/613* (2015.04); *H01M 10/615* (2015.04); *H01M 10/617* (2015.04); *H01M 10/653* (2015.04); *H01M 10/6556* (2015.04); *H01M 10/6568* (2015.04)

(58) Field of Classification Search
CPC .. H01M 10/61; H01M 10/613; H01M 10/615; H01M 10/617; H01M 10/653; H01G 11/18
See application file for complete search history.

(56) References Cited

U.S. PATENT DOCUMENTS

| | | |
|---|---|---|
| 2005/0074666 A1 | 4/2005 | Kimiya et al. |
| 2011/0206948 A1 | 8/2011 | Asai et al. |

FOREIGN PATENT DOCUMENTS

| | | |
|---|---|---|
| CN | 102163702 A | 8/2011 |
| CN | 202004060 U | 10/2011 |
| CN | 202004117 U | 10/2011 |

(Continued)

OTHER PUBLICATIONS

Chinese Office Action for Chinese Application No. 201280048758.1 dated Nov. 30, 2015 with English translation.

*Primary Examiner* — Stephan Essex
(74) *Attorney, Agent, or Firm* — Muncy, Geissler, Olds & Lowe, P.C.

(57) ABSTRACT

A thermal transfer device for generating a thermal transfer between an energy store and a temperature-control panel for the temperature-control of the energy store. The thermal transfer device has a thermal insulation layer made of an unevenly distributed insulation material and a tolerance compensating layer made of a compressible material for compensating different material strengths of the thermal insulation layer.

15 Claims, 4 Drawing Sheets

(56) References Cited

FOREIGN PATENT DOCUMENTS

| | | |
|---|---|---|
| DE | 10 2007 009 315 A1 | 8/2007 |
| DE | 10 2008 059 952 A1 | 6/2010 |
| DE | 10 2009 014 954 A1 | 10/2010 |
| DE | 10 2010 013 222 A1 | 9/2011 |

THERMAL TRANSFER DEVICE, TEMPERATURE-CONTROL PANEL, AND ENERGY STORAGE DEVICE

This nonprovisional application is a continuation of International Application No. PCT/EP2012/069592, which was filed on Oct. 4, 2012, and which claims priority to German Patent Application No. DE 10 2011 084 002.8, which was filed in Germany on Oct. 4, 2011, and which are both herein incorporated by reference.

BACKGROUND OF THE INVENTION

Field of the Invention

The present invention relates to a thermal transfer device for producing a thermal transfer between an energy store and a temperature-control plate for the temperature control of the energy store, to a temperature-control plate, and to an energy storage device.

Description of the Background Art

High-performance energy stores such as, for example, Li-ion or NiMH batteries or supercaps are used in modern hybrid electric vehicles (HEV) or electric vehicles (EV). Heating occurs in these during rapid charging and discharging due to resistances within and outside the cells. Temperatures above 50° C. damage the energy stores permanently. To assure the function of the energy stores, these must be cooled actively. To this end, the energy stores are brought into thermal contact with a temperature-control plate. In addition, it is necessary to heat the battery cells at low ambient temperatures. Homogeneous cooling or heating of the battery is necessary for a maximum electrical power and a high service life of the battery; i.e., all cells should be at the same temperature level in each operational state.

SUMMARY OF THE INVENTION

It is therefore an object of the present invention to provide an improved thermal transfer device for producing a thermal transfer between an energy store and a temperature-control plate for the temperature control of the energy store, an improved temperature-control plate, and an improved energy storage device.

In an embodiment, the object is attained by a thermal transfer device, a temperature-control plate, and an energy storage device according to the main claims.

To keep a maximum temperature difference on a surface of an energy store, for example, a battery cell, as low as possible over time, an arrangement of a plurality of functional layers is proposed which allow the thermal resistance to the surface of the energy store to be selectively influenced. For example, a battery cooling plate with a locally adapted thermal interface (LaThin) can therefore be realized.

As a result, it is no longer necessary to supply a temperature-control plate, for example, a cooling plate, for the temperature control of an energy store with a suitably high coolant volume flow, so that the temperature gradient in the coolant is kept low and the energy store or cells of the energy store are cooled homogeneously. If the thermal resistance of the arrangement of a plurality of functional layers along a flow direction of the coolant changes, then the coolant volume flow can be kept low, because a temperature gradient in the coolant can be compensated by the changing thermal resistance. By being able to avoid a high volume flow, low pressure losses occur in the system, so that the other components in the circuit can be dimensioned smaller; thus, for example, small, light, and cost-effective pumps can be used.

In addition, complex bracing devices which uniformly brace the energy store with the temperature-control plate can be omitted. Inhomogeneities in the contact pressure affect the thermal resistance. The greater the contact pressure, the higher the thermal resistance and the better the energy store is cooled. If the thermal resistance of the arrangement changes because of inhomogeneities in the bracing, the differences in the thermal resistance can be compensated by the introduction of a plurality of functional layers. As a result, additional, complex elements for the bracing can also be omitted.

Advantageously, a homogeneous cooling or heating of an energy store can be realized by the functional layers. If the energy store has a plurality of cells, it can be assured that all cells are at the same temperature level in every operational state.

The present invention provides a thermal transfer device for producing a thermal transfer between an energy store and a temperature-control plate for the temperature control of the energy store with the following features: a thermal insulation layer made of an insulation material distributed unevenly over the thermal insulation layer; and a tolerance compensating layer made of a compressible material for compensating different material thicknesses of the thermal insulation layer, whereby the thermal insulation layer is arranged adjacent to the tolerance compensating layer.

The tolerance compensating layer is also suitable for compensating manufacturing-related tolerances of the cells in the energy store. The tolerances are height tolerances of the cells relative to one another and tolerances or unevenness on the cell bottom.

The energy store can be a battery such as, for example, a Li-ion or NiMH battery or a supercap. The energy store may comprise a plurality of battery cells. The energy store can be suitable for operating a hybrid-electric vehicle or an electric vehicle. The temperature-control plate can function as a heat source or heat sink. The temperature-control plate accordingly can be used for heating or cooling the energy store. The temperature-control plate can have one or more channels for conducting a fluid, for example, a coolant. The thermal transfer device can be arranged between a surface of the temperature-control plate and a surface of the energy store. The thermal transfer device is therefore suitable for producing a planar connection between the temperature-control plate and the energy store. The thermal transfer device can also be arranged between a surface of the temperature-control plate and a surface of a heating device. Thus, the transfer device can be arranged below the temperature-control plate, e.g., if the heating device is located below the temperature-control plate. In this regard, depending on the design, both the thermal insulation layer and the tolerance compensating layer can be arranged on the thermal transfer device side facing the energy store. The thermal insulation layer can consist solely of the insulation material. Being unevenly distributed in regard to the thermal insulation layer can mean that the material thickness of the insulation layer and therefore the entire thermal insulation layer varies over a main extension surface of the thermal insulation layer. In this way the thermal insulation layer can have different thicknesses. A material thickness of the insulation material can be equal to zero in one or more regions of the thermal insulation layer. In this case, the thermal insulation layer can comprise no insulation material in the region or regions. Therefore, a thickness of the thermal insulation layer in the region or regions can also be equal to zero. The thermal insulation layer can consist of a rigid material or a material incompressible in relation to a contact force prevailing between the energy store and the temperature-control plate. The tolerance compensating layer can consist of a different material than the thermal insulation layer. The tolerance compensating layer can have a higher thermal conductivity than the thermal insulation layer. For example, the thermal conductivity of the tolerance compensating layer can be at least four or five times as great as the thermal conductivity of the thermal insulation layer. Compressible material in relation to the tolerance compensating layer can signify that the material can deform due to a contact force prevailing between the energy store and the temperature-control plate. In this way, different thicknesses of the thermal insulation layer and tolerances of the cells in the energy store can be compensated among one another. At least part of the tolerance compensating layer can engage in the thermal insulation layer. In particular, regions of the thermal insulation layer, which have little or no insulation material, can be compensated by the compressible material of the tolerance compensating layer.

In this regard, the tolerance compensating layer can be made from a compressible material, whereby the compressible material can be provided as bonding by means of an adhesive or as a sealing compound.

The thermal insulation layer can be arranged adjacent to the tolerance compensating layer. The thermal insulation layer and the tolerance compensating layer can be arranged in the shape of the stack and directly adjacent to one another. Therefore, the tolerance compensating layer can also extend over regions of the thermal insulation layer, which have a maximum material thickness of the insulation material. Tolerances of the thermal insulation layer can be compensated well by the tolerance compensating layer by the adjacent arrangement.

The thermal insulation layer can have a thermal conductivity of less than 0.6 W/mK. According to different embodiments, the thermal insulation layer can also have a thermal conductivity of, for example, less than 0.4 W/mK, 0.3 W/mK, 0.2 W/mK, or 0.1 W/mK. In particular, the insulation layer of the thermal insulation layer can have the mentioned thermal conductivity. Because of the low thermal conductivity of the insulation material, the thermal resistance of the thermal insulation layer can be increased in certain regions by a selective distribution of the insulation material over the thermal insulation layer.

In this regard, the tolerance compensating layer can have a thermal conductivity greater than 0.7 W/mK. According to different embodiments, the tolerance compensating layer can also have a thermal conductivity of, for example, greater than 1.0 W/mK, 1.3 W/mK, 1.6 W/mK, or 1.9 W/mK. In particular, the material of the tolerance compensating layer can have the indicated thermal conductivity. Good heat transfer between the temperature-control plate and the energy store is possible due to the high thermal conductivity of the material of the tolerance compensating layer.

The thermal insulation layer can have a maximum material thickness of less than 600 μm. According to different embodiments, the thermal insulation layer can also have a maximum material thickness of less than 400 μm or 200 μm. Because of the small thickness, the heat flow between the temperature-control plate and the energy store is only slightly restricted.

The tolerance compensating layer can have a material thickness that is between 0.3 mm and 2 mm. The tolerance compensating layer can have, for example, a material thickness that is greater than the maximum material thickness of the thermal insulation layer and smaller than four, five, or six times the maximum material thickness of the thermal insulation layer. As a result, the different thicknesses of the thermal insulation layer can be well compensated by the tolerance compensating layer.

The thermal insulation layer can have a first region with a first material thickness, a second region with a second material thickness, and a third region with a third material thickness. In this regard, the second region can be arranged between the first and third regions. The first material thickness can be greater than the second material thickness and the second material thickness can be greater than the third material thickness. For example, the material thickness of the third region can be thinner than the material thickness of the first region. The first, second, and third regions can be arranged along a flow direction or a flow path length of a fluid within the temperature-control plate. The first, second, and third regions can also be arranged parallel to a flow direction or a flow path length of the fluid within the temperature-control plate, if differences in contact pressure are to be compensated. The first region in this case can be arranged upstream in regard to the flow direction and the third region downstream in regard to the flow direction. The flow direction can apply, for example, to a cooling mode of the temperature-control plate. The material thickness can decline continuously between a maximum material thickness in the first region and a minimal material thickness in the third region. It is not necessary in this case that the material thickness always declines continuously or linearly. The decline in the material thickness can also be exponential. Or, as described above, it can be that, for example, the third region again has a greater thickness than the second region.

In this way, different thermal resistances of the thermal transfer device can be realized over different thicknesses of the thermal insulation layer.

The thermal insulation layer can have a first section and a second section. In this regard, the insulation material can be arranged solely in the first section. Therefore, no insulation material is present in the second section. The thickness of the thermal insulation layer can be equal to zero in the second section. In the first section, the thermal insulation layer can have the insulation material in a constant or variable material thickness. The tolerance compensating layer can project into the second section. The tolerance compensating layer can have both a plurality of first sections and a plurality of second sections. The first section can be formed by a plurality of recesses in the second section, or vice versa. The recesses can be, for example, round, oval, rectangular, triangular, hexagonal, or strip-shaped. The size or diameter of the plurality of the recesses can change along the flow direction. The first and second sections can be arranged alternately in the flow direction or transverse to the flow direction. A surface portion of the first section in regard to a surface portion of the second section in the thermal insulation layer can vary along the flow direction. The change can also be parallel to it, for example, if differences in the contact pressure are to be compensated. In this way, different thermal resistances of the thermal transfer device can be realized via the presence and absence of the insulation material within the thermal insulation layer.

The thermal transfer device can have an electrical insulation layer. The electrical insulation layer can be arranged adjacent to the tolerance compensating layer or adjacent to the thermal insulation layer. The thermal transfer device can therefore have a stack-shaped structure, which comprises at least the tolerance compensating layer, the thermal insulation layer, and the electrical insulation layer.

An electrical insulation between the temperature-control plate and the energy store can be realized by the electrical insulation layer.

The thermal transfer device can have a heating layer. The heating layer can be arranged adjacent to the tolerance compensating layer or adjacent to the thermal insulation layer. The thermal transfer device can therefore have a stack-shaped structure, which comprises at least the tolerance compensating layer, the thermal insulation layer, and the heating layer. The thermal transfer device can be heated by operation of the heating layer. The heating layer can be designed to convert electrical energy into heat. Depending on the embodiment of the heating layer, the heating layer can be designed in addition or alternatively to cool the thermal transfer device. For example, the heating layer can comprise heating resistors or Peltier elements.

In an embodiment, the present invention further provides a temperature-control plate for the temperature control of an energy store, with the following features: a flow channel layer, which has at least one flow channel for conducting a fluid; and a thermal transfer device, which is connected in the shape of a stack to the flow channel layer.

In an embodiment, the present invention provides further an energy storage device with the following features: a temperature-control plate; and an energy store which is arranged on a surface of the thermal transfer device of the temperature-control plate.

Thus, the approach of the invention can be used advantageously for the temperature control of an energy store.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
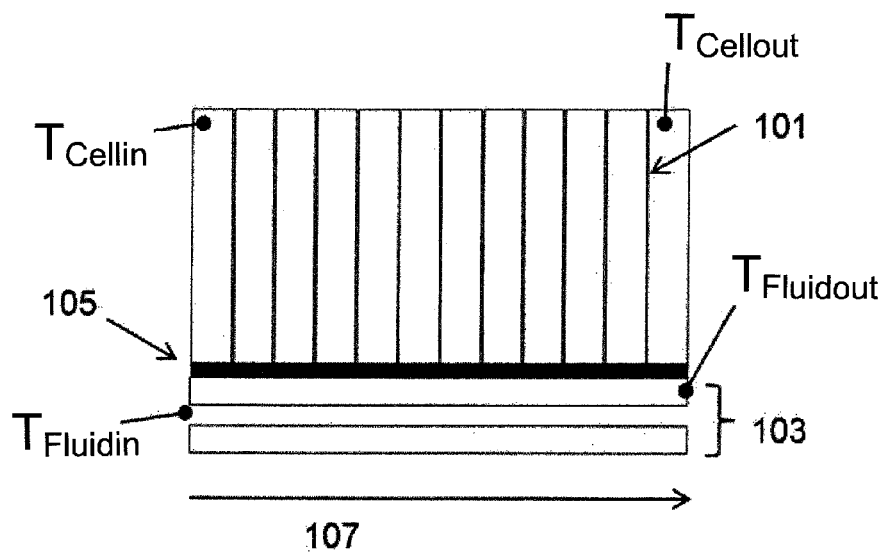
FIG. 1 is an illustration of an energy storage device according to an exemplary embodiment.

FIG. 1 shows a cross-sectional illustration of an energy storage device according to an exemplary embodiment of the present invention. The energy storage device has an energy store in the form of battery cells 101, a temperature-control plate in the form of a cooling plate 103 with at least one flow channel, and a thermal transfer device 105, arranged between battery cells 101 and cooling plate 103, in the form of functional layers.

Battery cells 101 are arranged next to one another on a surface of an outer layer of the functional layers of transfer device 105. During operation of the energy storage device, a fluid can flow through the flow channel of cooling plate 103. A flow path length 107 or flow direction of the fluid between an inlet and an outlet of the flow channel is indicated by an arrow. The fluid has a temperature $T_{Fluidin}$ at the inlet. The fluid has a temperature $T_{Fluidout}$ at the outlet. A battery cell 101 located closest to the inlet has a temperature $T_{Cellin}$. A battery cell 101 located closest to the outlet has a temperature $T_{Cellout}$.

Figure 2:
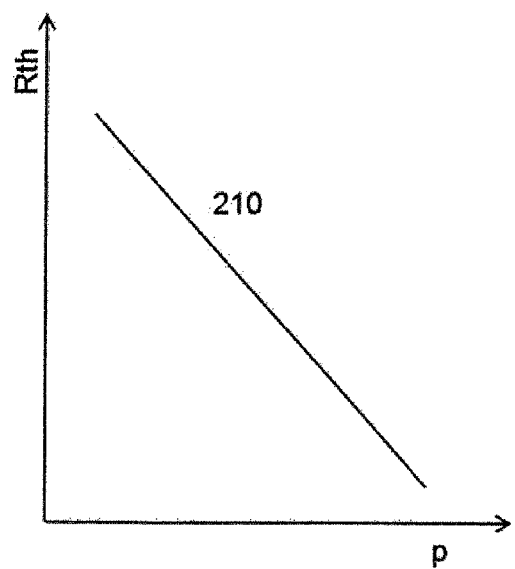
FIG. 2 is a diagram in regard to the thermal resistance according to an exemplary embodiment.

FIG. 2 shows a diagram with respect to a course 210 of the thermal resistance of the thermal transfer device, shown in FIG. 1, in the form of functional layers. The contact pressure p, resulting from the bracing device, between the battery cells and the cooling plate is plotted on the abscissa. The thermal resistance Rth is plotted on the ordinate. According to this exemplary embodiment, there is a linear relationship between the contact pressure and the thermal resistance, whereby the thermal resistance declines with increasing contact pressure. The relationship can also be nonlinear.

Figure 3:
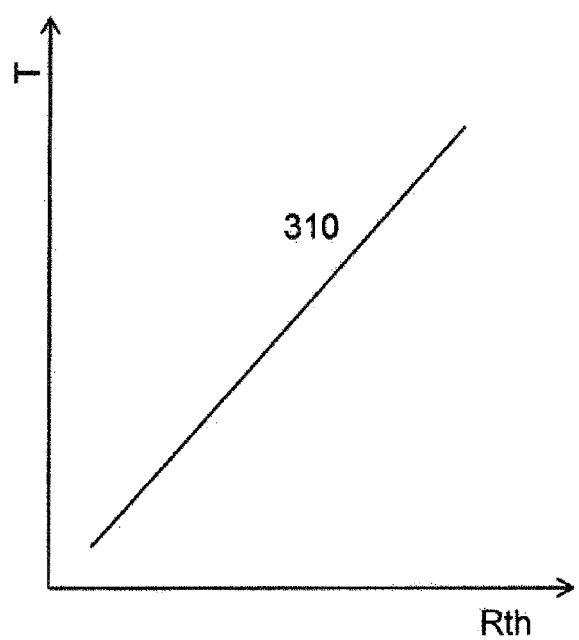
FIG. 3 is a diagram in regard to the cell temperature according to an exemplary embodiment.

FIG. 3 shows a diagram with respect to a course curve 310 of the cell temperature of the battery cells shown in FIG. 1. The thermal resistance Rth between the battery cells and the cooling plate is plotted on the abscissa. The cell temperature T is plotted on the ordinate. There is a linear relationship between the thermal resistance Rth and the cell temperature, whereby the cell temperature increases with an increasing thermal resistance Rth.

Figure 4:
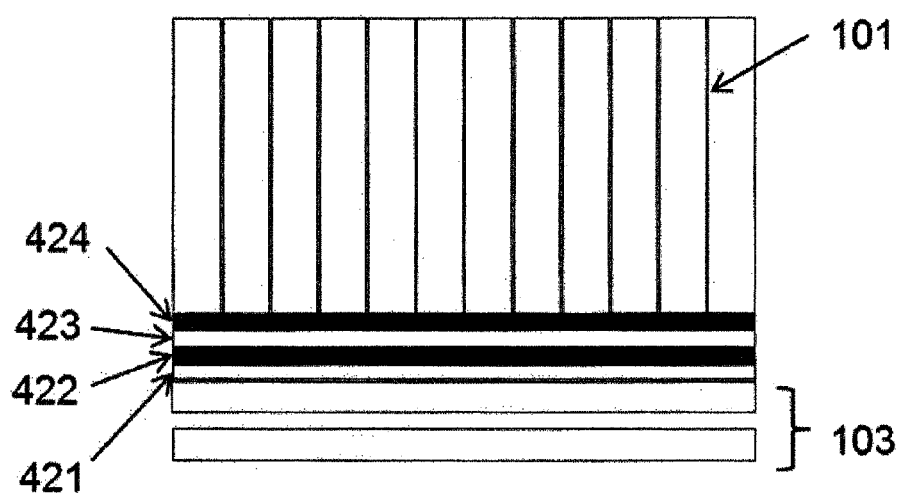
FIG. 4 is an illustration of an energy storage device according to an exemplary embodiment.

FIG. 4 shows a cross-sectional illustration of an energy storage device according to an exemplary embodiment of the present invention. The energy storage device, according to the energy storage device shown in FIG. 1, has an energy store in the form of battery cells 101, a temperature-control plate in the form of a cooling plate 103 having at least one flow channel, and a thermal transfer device which is arranged between battery cells 101 and cooling plate 103 and has a plurality of functional layers 421, 422, 423, 424. Functional layers 421, 422, 423, 424 are arranged stacked one above the other, whereby the adjacently arranged layers of layers 421, 422, 423, 424 touch one another. The thermal transfer device has an electrical insulation 421, a heating layer 422, a thermal insulation layer 423, and a tolerance compensating layer 424. Electrical insulation 421 is arranged directly adjacent to cooling plate 103. Tolerance compensating layer 424 is arranged directly adjacent to battery cells 101. The layer structure shown in FIG. 4 is a possible layer structure which is not illustrated to scale. The sequence of layers 421, 422, 423, 424 can also be changed. Further, individual layers 421, 422, 423, 424 can be omitted or replaced or supplemented by other suitable layers.

Figure 5:
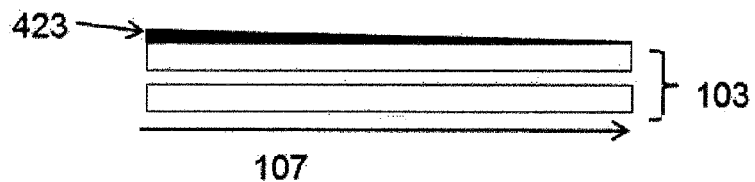
FIG. 5 is an illustration of a temperature-control plate with a thermal transfer device according to an exemplary embodiment.

FIG. 5 shows a cross-sectional illustration of a temperature-control plate 103 on which a thermal insulation layer 423 of a thermal transfer device is arranged. Temperature-control plate 103 can be made as described with the use of FIG. 1. The thermal transfer device can have further layers, as described with the use of FIG. 4. Thermal insulation layer 423 is made wedge-shaped. Thermal insulation layer 423 along flow path length 107 proceeding from a maximum thickness in the area of the entry of the fluid into the flow channel has a uniformly decreasing thickness up to a minimal thickness in the area of the exit of the fluid. The different thickness of thermal insulation layer 423 can be compensated by the material of a tolerance compensating layer. The illustration is not to scale.

Figure 6:
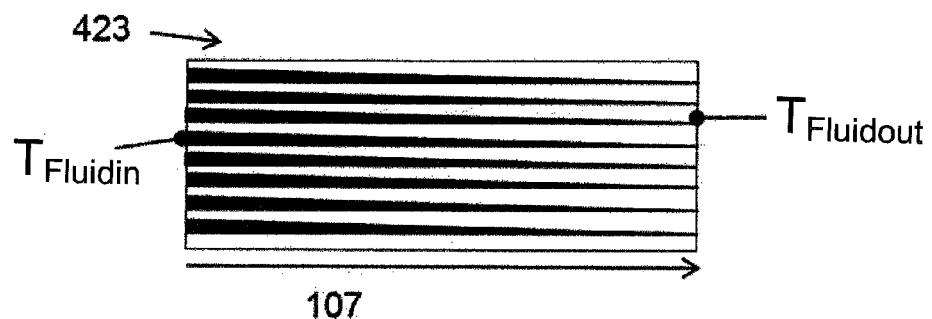
FIG. 6 is an illustration of a thermal transfer device according to an exemplary embodiment.

FIG. 6 shows a plan view of a thermal insulation layer 423 of a thermal transfer device according to an exemplary embodiment of the present invention. The thermal transfer device can have further layers, as described with the use of FIG. 4. Thermal insulation layer 423 can be arranged directly on a temperature-control plate or separated by one or more further layers of the thermal transfer device. In the plan view shown in FIG. 6, the temperature-control plate is covered by thermal insulation layer 423. Thermal insulation layer 423 has a variable surface portion, whereby the illustration in FIG. 6 is not to scale. Thermal insulation layer 423 transverse to flow path length 107 has a plurality of strips which are arranged next to one another and taper in the direction of the flow path length. The strips are made triangular in shape. The strips can be formed by a suitable insulation material. Interspaces between the strips can be filled by a material of a tolerance compensating layer.

Figure 7:
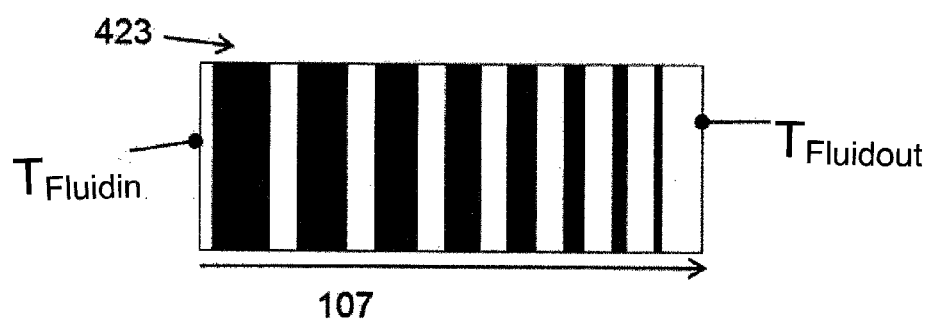
FIG. 7 is an illustration of a thermal transfer device according to an exemplary embodiment.

FIG. 7 shows a plan view of a thermal insulation layer 423 of a thermal transfer device according to an exemplary embodiment of the present invention. The thermal transfer device can have further layers, as described with the use of FIG. 4. Thermal insulation layer 423 can be arranged directly on a temperature-control plate or separated by one or more further layers of the thermal transfer device. In the plan view shown in FIG. 7, the temperature-control plate is covered by thermal insulation layer 423. Thermal insulation layer 423 has a variable surface portion, whereby the illustration in FIG. 7 is not to scale. Thermal insulation layer 423 along flow path length 107 has a plurality of strips, which are arranged next to one another and transverse to flow path length 107 and which become narrower in the direction of the flow path length. The strips are made straight. The strips can be formed by a suitable insulation material. Interspaces between the strips can be filled by a material of a tolerance compensating layer.

Figure 8:
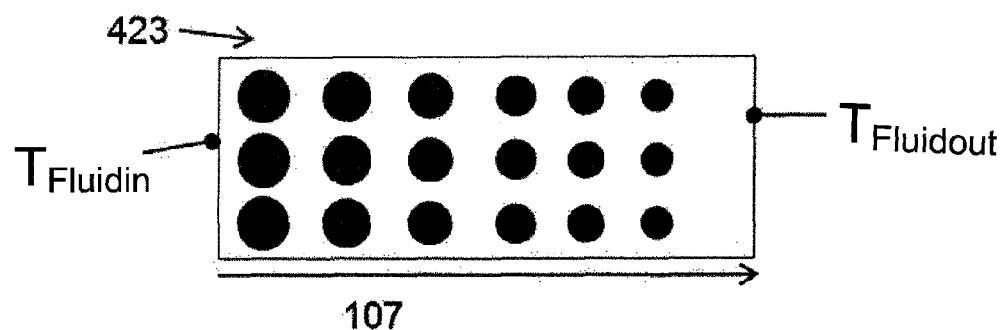
FIG. 8 is an illustration of a thermal transfer device according to an exemplary embodiment.

FIG. 8 shows a plan view of a thermal insulation layer 423 of a thermal transfer device according to an exemplary embodiment of the present invention. The thermal transfer device can have further layers, as described with the use of FIG. 4. Thermal insulation layer 423 can be arranged directly on a temperature-control plate or separated by one or more further layers of the thermal transfer device. In the plan view shown in FIG. 8, the temperature-control plate is covered by thermal insulation layer 423. Thermal insulation layer 423 has a variable surface portion, whereby the illustration in FIG. 8 is not to scale. Thermal insulation layer 423 has a plurality of individual areas made of insulation material. The individual areas are arranged in a plurality of rows and columns. The rows run in the direction of the flow path length and the columns transverse thereto. The individual areas arranged in a column each have the same size. According to this exemplary embodiment, individual areas in adjacent columns each have different sizes, whereby the size of the individual areas declines in the direction of flow path length 107. The size distribution of the areas can also be different, however. According to said exemplary embodiment, the individual areas are formed in each case, by way of example, as circles, whereby other geometries are also possible. The individual areas can be formed by a suitable insulation material. Interspaces between the individual areas can be filled by a material of a tolerance compensating layer.

Figure 9:
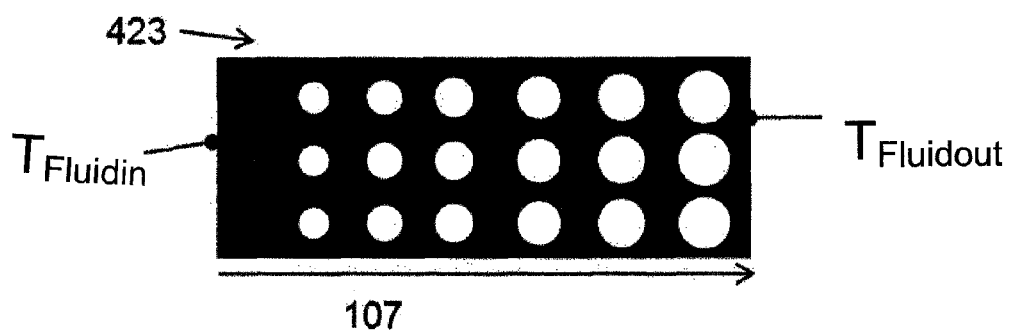
FIG. 9 is an illustration of a thermal transfer device according to an exemplary embodiment.

FIG. 9 shows a plan view of a thermal insulation layer 423 of a thermal transfer device according to an exemplary embodiment of the present invention. The thermal transfer device can have further layers, as described with the use of FIG. 4. Thermal insulation layer 423 can be arranged directly on a temperature-control plate or separated by one or more further layers of the thermal transfer device. In the plan view shown in FIG. 9, the temperature-control plate is covered by thermal insulation layer 423. Thermal insulation layer 423 has a variable surface portion, whereby the illustration in FIG. 9 is not to scale. Thermal insulation layer 423 has an area made of insulation material. A plurality of recesses is arranged in the area made of insulation material. The individual recesses are arranged in a plurality of rows and columns. The rows run in the direction of the flow path length and the columns transverse thereto. The recesses arranged in a column here have in each case, by way of example, the same size. Individual recesses in adjacent columns in each case have different sizes, whereby the size of the individual recesses increases in the direction of flow path length 107. According to said exemplary embodiment, the individual recesses are each formed as circles. The recesses can be filled by a material of a tolerance compensating layer.

Exemplary embodiments of the present invention will be described in detail below with use of FIGS. 1 to 9.

Compensation of a temperature inhomogeneity along flow path length 107 of a flow channel of a cooling plate 103 can be provided by the combination of a thermal insulation layer 423 and a tolerance compensating layer 424.

The temperature inhomogeneity can be caused by a design of cooling plate 103. As can be shown with use of FIG. 1, the fluid heats up over flow path length 107, as a result of which a temperature gradient arises in the coolant. It is the case here that the temperature $T_{Fluidout}$ is greater than the temperature $T_{Fluidin}$.

This has the result that battery cells 101 are not evenly cooled well. This means that cells 101 are cooled better at the beginning of flow path length 107 and more poorly toward the end of flow path length 107. Therefore, the temperature $T_{Cellout}$ is greater than the temperature $T_{Cellin}$. As a result, a temperature inhomogeneity arises across battery cells 101.

The temperature inhomogeneity can also be caused by a device, which brings cells 101 into thermal contact with cooling plate 103. Thus, cells 101 in a certain region can be pressed unevenly against cooling plate 103. In this regard, the thermal resistance $R_{th}$ depends on the contact pressure. As shown in FIGS. 2 and 3, the greater the contact pressure, the lower the thermal resistance, and the better the cells are cooled. This results in a temperature inhomogeneity.

Thermal transfer device 105, which comprises at least thermal insulation layer 423 and tolerance layer 424, makes possible a selective, local adjustment of the thermal interface to battery cells 101. As described in FIG. 4, a plurality of functional layers 421, 422, 423, 424 can be used for this purpose, which can be arranged in different sequences.

Functional layers 421, 422, 423, 424 will be described in detail below.

Electrical insulation 421 can be used as the first layer. Electrical insulation layer 421 is optional. For example, a KTL coating (cathodic dip painting), other coatings, eloxal, or a suitable film can be used as electrical insulation 421.

Thermal insulation layer 423 can be used as the second layer. Thermal insulation layer 423 is typically less than 300 µm, incompressible, and preferably has a thermal conductivity less than 0.3 W/mK.

According to an exemplary embodiment, thermal insulation layer 423 has a position-dependent variability in thickness, as is shown in FIG. 5. The decline in thickness occurs in flow path length 107. This is not obligatory, however, as has been described above. To compensate for the different contact pressure, there is an increasing thickness with increasing contact pressure. The decreasing thickness results in a decline of thermal resistance, which in turn leads to better cell cooling. Thermal insulation layer 423 can be realized, for example, by spray coating with different coating times or by adhesive tape. When adhesive tape is used, a stacked arrangement of a plurality of adhesive tapes, a variable stretched adhesive tape, which, e.g., is pulled over a roll, a dip coating, or an adhesive tape with a different thickness can be used.

According to an exemplary embodiment, thermal insulation layer 423 is structured depending on the position, and therefore has a variable surface portion, as is shown in FIGS. 6 to 9. Here, a decrease in the surface portion occurs in the flow path length. This is not obligatory, however, as has been described above. To compensate for the different contact pressure, there is an increasing thickness with increasing contact pressure. A smaller surface portion results in a decline of thermal resistance, which again results in better cell cooling. Thermal insulation layer 423 can be realized, for example, by screen printing with a structural size in the range of 0.2 mm to 10 mm, by an adhesive tape, a film, or by stencil printing.

According to a further exemplary embodiment, thermal insulation layer 423 has a position-dependent variability in thickness and, moreover, is structured depending on the position, and therefore is realized by a combination of the two previously described exemplary embodiments.

Tolerance compensating layer 424 can be used as the third layer. Tolerance compensating layer 424 typically has a thickness of 0.5 mm to 1.5 mm, is compressible, and preferably has a thermal conductivity greater than 1.5 W/mK. Tolerance compensating layer 424 can be realized by a continuous coating or a structured coating. Such coatings can be produced, for example, by casting, by dispensing, for example, by means of a multi-tip nozzle, by screen printing, or by stencil printing, or by vulcanization. Tolerance compensating layer 424 can also be realized by a thermally conductive film.

Heating layer 422 can be used as a fourth layer. Heating layer 422 is optional. Positioning of heating layer 422 occurs above electrical insulation 421, preferably below tolerance compensating layer 424. In this case, above can mean in the direction of battery cells 101 and below in the direction of cooling plate 103. Heating layer 422 can be produced by printed traces, for example, by screen printing, or by a coating with PTC material and in addition printed traces.

The temperature gradients between cells 101 can be reduced in a desired manner by the mentioned layers 421, 422, 423, 424.

The described exemplary embodiments have been selected only by way of example and can be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermal transfer device for producing a thermal transfer between an energy store and a temperature-control plate for the temperature control of the energy store, the thermal transfer device comprising:
    a thermal insulation layer made of an insulation material distributed unevenly over the thermal insulation layer; and
    a tolerance compensating layer made of a material for compensating different material thicknesses of the thermal insulation layer,
    wherein, the tolerance compensating layer compensates for the uneven distribution of the thermal insulation layer, such that, along a flow direction of the thermal transfer device, as a volume of the insulation material in the thermal insulation layer decreases, a volume of the material in the tolerance compensating layer increases and as the volume of the insulation material in the thermal insulation layer increases, the volume of the material in the tolerance compensating layer decreases, and
    wherein the material of the tolerance compensating layer is compressible such that the material is deformable due to a contact force between the energy store and the temperature-control plate.

2. The thermal transfer device according to claim 1, wherein the thermal insulation layer is arranged adjacent to the tolerance compensating layer.

3. The thermal transfer device according to claim 1, wherein the thermal insulation layer has a thermal conductivity of less than 0.6 W/mK and a maximum material thickness of less than 600 µm and wherein the tolerance compensating layer has a thermal conductivity greater than 0.7 W/mK.

4. The thermal transfer device according to claim 1, wherein the thermal insulation layer has a first region with a first material thickness, a second region with a second material thickness, and a third region with a third material thickness, and wherein the second region is arranged between the first and third regions.

5. The thermal transfer device according to claim 1, wherein the thermal insulation layer has a first section and a second section, and wherein the insulation material is arranged solely in the first section.

6. The thermal transfer device according to claim 5, wherein a size of a surface portion of the first section relative to a size of a surface portion of the second section changes along the thermal insulation layer or transverse to a main extension direction of the thermal insulation layer.

7. The thermal transfer device according to claim 1, further comprising an electrical insulation layer that is arranged adjacent to the tolerance compensating layer or adjacent to the thermal insulation layer.

8. The thermal transfer device according to claim 1, having a heating layer that is arranged adjacent to the tolerance compensating layer or adjacent to the thermal insulation layer.

9. The thermal transfer device according to claim 1, wherein material of the tolerance compensating layer is formed as bonding by an adhesive or as a sealing compound.

10. A temperature-control plate for the temperature control of an energy store comprising:
    a flow channel layer that has at least one flow channel for conducting a fluid; and a thermal transfer device according to claim 1 that is connected in a shape of a stack to the flow channel layer.

11. An energy storage device comprising:
a temperature-control plate according to claim 10; and
an energy store that is arranged on a surface of the thermal transfer device of the temperature-control plate.

12. A thermal transfer device for producing a thermal transfer between an energy store and a temperature-control plate for the temperature control of the energy store, the thermal transfer device comprising:
a thermal insulation layer made of an insulation material distributed unevenly over the thermal insulation layer; and
a tolerance compensating layer made of a material for compensating different material thicknesses of the thermal insulation layer,
wherein, the tolerance compensating layer compensates for the uneven distribution of the thermal insulation layer, such that, along a flow direction of the thermal transfer device, as a volume of the insulation material in the thermal insulation layer decreases, a volume of the material in the tolerance compensating layer increases and as the volume of the insulation material in the thermal insulation layer increases, the volume of the material in the tolerance compensating layer decreases, and
wherein the material of the tolerance compensating layer is less rigid than the insulation material of the thermal insulation layer.

13. A thermal transfer device for producing a thermal transfer between an energy store and a temperature-control plate for the temperature control of the energy store, the thermal transfer device comprising:
a thermal insulation layer made of an insulation material distributed unevenly over the thermal insulation layer; and
a tolerance compensating layer made of a material for compensating different material thicknesses of the thermal insulation layer,
wherein, the tolerance compensating layer compensates for the uneven distribution of the thermal insulation layer, such that, along a flow direction of the thermal transfer device, as a volume of the insulation material in the thermal insulation layer decreases, a volume of the material in the tolerance compensating layer increases and as the volume of the insulation material in the thermal insulation layer increases, the volume of the material in the tolerance compensating layer decreases,
wherein more of the insulation material of the thermal insulation layer is distributed at a side of the thermal insulation layer corresponding to an inlet side of a flow channel of the temperature-control plate than at a side of the thermal insulation layer corresponding to an outlet side of the flow channel, and
wherein less of the material of the tolerance compensating layer is distributed at a side of the tolerance compensating layer corresponding to the inlet side of the flow channel than at a side of the tolerance compensating layer corresponding to the outlet side of the flow channel.

14. The thermal transfer device according to claim 13, wherein the inlet side of the flow channel is provided on a first end of the temperature-control plate and the outlet side of the flow channel is provided on a second end of the temperature-control plate, the first end opposing the second end.

15. The thermal transfer device according to claim 4, wherein the first material thickness is different from both the second material thickness and the third material thickness, and wherein the second material thickness is different from the third material thickness.

* * * * *